United States Patent
Schafer, Jr.

(10) Patent No.: US 11,458,904 B2
(45) Date of Patent: Oct. 4, 2022

(54) CARGO RACK SYSTEM FOR A VEHICLE WITH A CONVERTIBLE OR REMOVABLE ROOF AND ITS ASSOCIATED METHOD OF INSTALLATION

(71) Applicant: George J. Schafer, Jr., Pennington, NJ (US)

(72) Inventor: George J. Schafer, Jr., Pennington, NJ (US)

(*) Notice: Subject to any disclaimer, the term of this patent is extended or adjusted under 35 U.S.C. 154(b) by 0 days.

(21) Appl. No.: 16/676,390

(22) Filed: Nov. 6, 2019

(65) Prior Publication Data

US 2020/0070731 A1    Mar. 5, 2020

Related U.S. Application Data

(63) Continuation-in-part of application No. 15/872,226, filed on Jan. 16, 2018.

(60) Provisional application No. 62/757,101, filed on Nov. 7, 2018.

(51) Int. Cl.
*B60R 7/04* (2006.01)
*B62D 65/02* (2006.01)

(52) U.S. Cl.
CPC .............. *B60R 7/04* (2013.01); *B62D 65/024* (2013.01)

(58) Field of Classification Search
CPC .......... B60R 7/04; B60R 9/052; B60R 9/058; B62D 65/024
See application file for complete search history.

(56) References Cited

U.S. PATENT DOCUMENTS

| | | |
|---|---|---|
| 2,552,293 A * | 5/1951 | Page ..................... B60R 7/14 414/462 |
| 4,538,752 A | 9/1985 | Welter |
| 5,492,259 A | 2/1996 | Tippets |
| 6,152,339 A | 11/2000 | Kreisler |
| D434,718 S | 12/2000 | Kreisler |
| 6,755,332 B2 | 6/2004 | Crane et al. |
| 8,496,146 B2 | 7/2013 | Badillo |

(Continued)

FOREIGN PATENT DOCUMENTS

DE          3150130 A1 *   6/1983       B60R 9/052

OTHER PUBLICATIONS

Wayne Dempsey, Pelican Parts, https://www.pelicanparts.com/techarticles/Boxster_Tech/95-MISC-Roof_Rack/95-MISC-Roof_Rack.htm, Screen shot captured on Nov. 8, 2016 (Year: 2016).*

(Continued)

*Primary Examiner* — Moshe Wilensky
*Assistant Examiner* — Kyle A Cook
(74) *Attorney, Agent, or Firm* — LaMorte & Associates, P.C.

(57) ABSTRACT

A system and method of connecting a cargo rack to a vehicle having a convertible, retractable or removable roof system. Reinforced frame sections of the vehicle are exposed by removing access panels and/or any obstructing trim. Attachment brackets are mounted to the reinforced frame sections. The attachment brackets extend above the roof well and into a gap space below the canopy of the roof system. A crossbar is mounted between the attachment brackets. The crossbar has a flat top surface that contains a plurality of receptacles. Various mounting accessories are provided, wherein each of the mounting accessories is configured to be selectively received by any one of the receptacles.

13 Claims, 6 Drawing Sheets

(56) References Cited

U.S. PATENT DOCUMENTS

| | | |
|---|---|---|
| 8,944,486 B2 | 2/2015 | Donohoe |
| 9,187,046 B2 | 11/2015 | Peck |
| 2005/0092796 A1 | 5/2005 | Essig |
| 2011/0101056 A1 | 5/2011 | Barkey |
| 2012/0193380 A1 | 8/2012 | McMurtrie |
| 2014/0069971 A1 | 3/2014 | van Kaathoven |
| 2015/0123422 A1 | 5/2015 | Bennett et al. |
| 2016/0046241 A1 | 2/2016 | Crismon et al. |
| 2016/0046242 A1 | 2/2016 | Peck |

OTHER PUBLICATIONS

Zoom Jones, YouTube, https://www.youtube.com/watch?v=zwnwmtyScQY, Published on Mar. 26, 2007 (Year: 2007).*
Machine Translation of DE3150130A1 (Year: 1983).*
Byron Young, Soft Top Removal Jeep Wrangler Unlimited 2016, YouTube, https://www.youtube.com/watch?v=2CF5XE0Hddk, Published Oct. 3, 2016 (Year: 2016).*

* cited by examiner

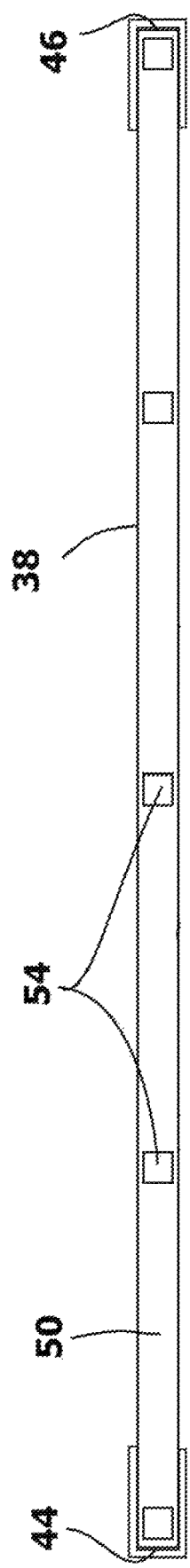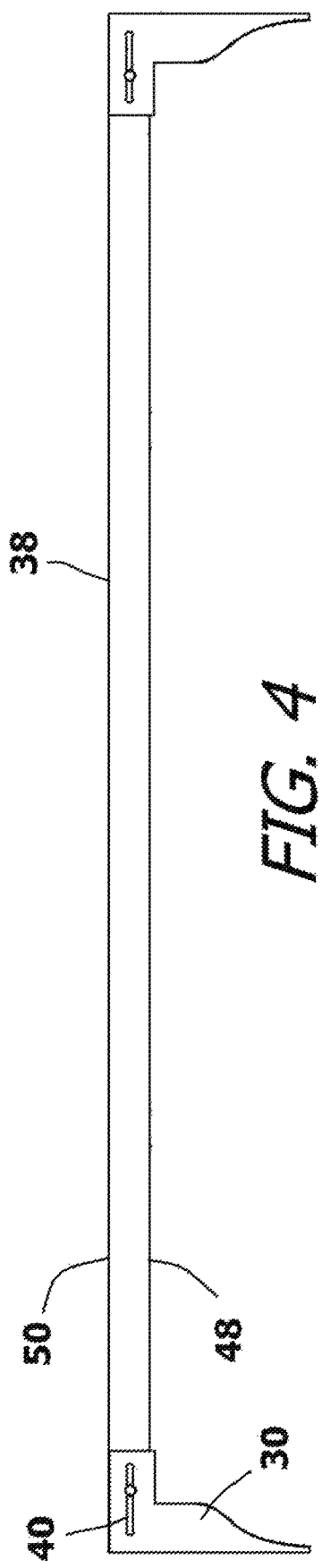

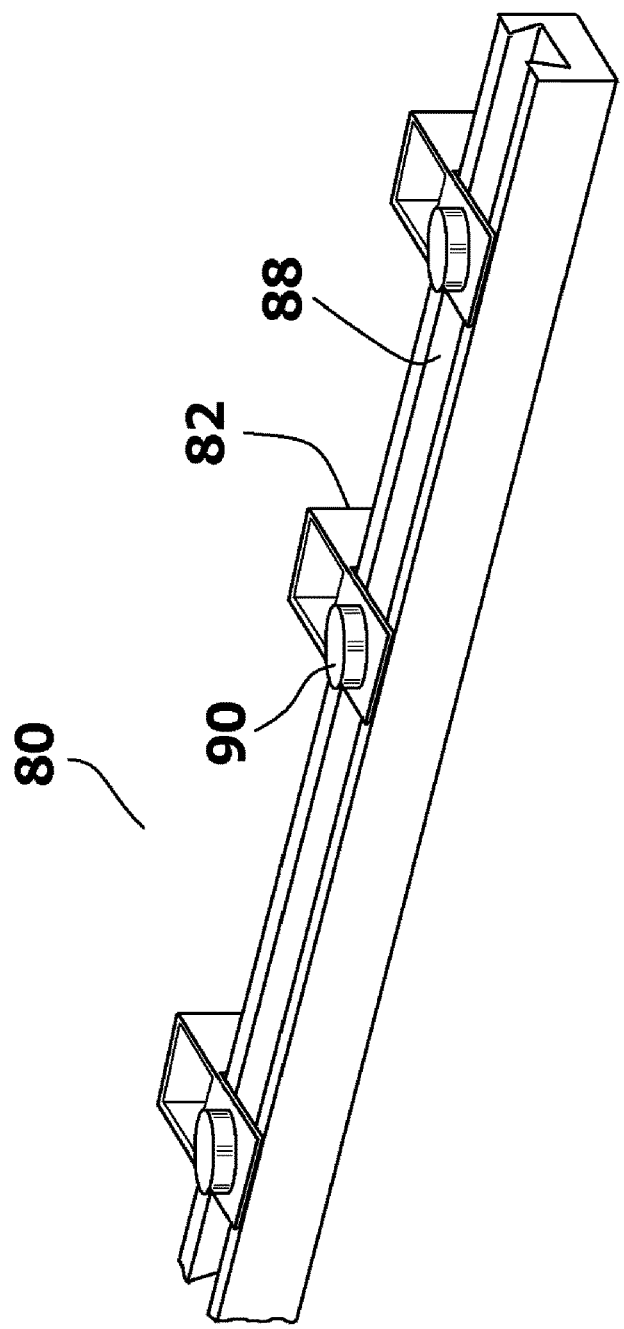
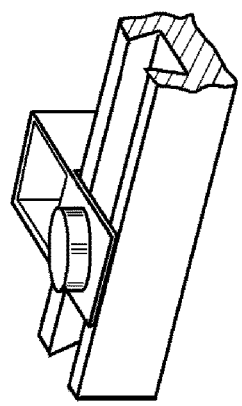
FIG. 7

CARGO RACK SYSTEM FOR A VEHICLE WITH A CONVERTIBLE OR REMOVABLE ROOF AND ITS ASSOCIATED METHOD OF INSTALLATION

RELATED APPLICATIONS

This application is a continuation-in-part of co-pending U.S. patent application Ser. No. 15/872,226 filed Jan. 16, 2018.

This application also claims the benefit of U.S. Provisional Application No. 62/757,101, filed Nov. 7, 2018.

BACKGROUND OF THE INVENTION

1. Field of the Invention

In general, the present invention relates to roof racks and cargo racks that are designed to attach to the framework of a vehicle that has a convertible or removable roof. More particularly, the present invention relates to roof racks and cargo racks that attach directly to the frame of a vehicle, such as the convertible Ford Mustang®.

2. Prior Art Description

Convertible sports cars, such as the Ford® Mustang® are very popular vehicles. In the convertible model, the vehicle has a convertible roof that is made from fabric. The roof is supported by a folding metal framework that enables the convertible roof to be either extended or retracted. Other models of vehicles have retractable roof systems, or removable hard roof systems that can be removed and added to a vehicle as desired.

Since such roof systems are convertible, retractable or removable, they are not integrated into the structural framework of the vehicle. The roof, therefore, is not designed to provide structural integrity to the vehicle. To compensate for the lack of an integrated roof, the frame of the vehicle is reinforced in order to keep the vehicle safe and stable. The reinforcements added to the frame are typically provided around the framework of the doors. The reinforcements help keep the frame rigid as the vehicle travels and experiences stresses. The reinforcements also provide side crash protection. Since the reinforced frame is very robust, the reinforced sections of the frame often serve as the point of attachment for the convertible, retractable or removable roof system.

In a vehicle with a convertible, retractable or removable roof, there is typically no place to mount a roof rack or some other cargo rack to the vehicle. If supports are added, then the presence of the supports prevents the roof system from being used or complicates the use of the roof. For example, if a traditional roof rack were added to a traditional convertible vehicle, the convertible roof would have to be opened and the convertible roof would be unable to close. The only alternative would be to build a roof rack framework around the convertible roof by attaching the framework to the bumpers and other exterior features of the convertible vehicle. This detracts significantly from the aesthetics and aerodynamics of the vehicle.

A need therefore exists for a roof rack system that can be applied to a vehicle with a convertible, retractable or removable roof, wherein the system attaches directly to the frame of the vehicle without adversely affecting the functionality of the existing roofing system. A need also exists for a roof rack system that does not detract from the overall aesthetics of the vehicle. These needs are met by the present invention as described below.

SUMMARY OF THE INVENTION

The present invention is a system and method of connecting a cargo rack to a vehicle having a convertible, retractable or removable roof system. The roof system has a canopy and support framework that is removable or seats in a roof well when not deployed. The roof system mounts to reinforced frame sections within the sides of the vehicle.

The reinforced frame sections of the vehicle are exposed by removing access panels and/or any obstructing trim. Attachment brackets are provided. The attachment brackets are mounted to the reinforced frame sections that have been exposed. Upon installation, the attachment brackets extend above the roof well and into a gap space below the canopy of the roof system.

A crossbar is mounted between the attachment brackets. The crossbar is suspended under the canopy so that the convertible roof system can be selectively opened and closed. The crossbar supports a plurality of receptacles that are periodically spaced along the flat top surface or are adjustable along the length of the crossbar. Various mounting accessories are provided, wherein each of the mounting accessories is configured to be selectively received by any one of the receptacles. In this manner, the mounting accessories can be rapidly added and removed as needed.

BRIEF DESCRIPTION OF THE DRAWINGS

For a better understanding of the present invention, reference is made to the following description of exemplary embodiments thereof, considered in conjunction with the accompanying drawings, in which:

FIG. 3 is a top view of a mounting crossbar from the exemplary cargo rack assembly;

FIG. 4 is a front view of a mounting crossbar from the exemplary cargo rack assembly;

FIG. 7 shows an alternate embodiment for the crossbar with adjustable mounting receptacles.

DETAILED DESCRIPTION OF THE DRAWINGS

Although the present invention cargo rack system can be adapted for use in many types of vehicles with convertible or removable roofs, the cargo rack system is especially well suited for use on a Ford® Mustang® convertible. Accordingly, the present invention cargo rack system is presented in an exemplary embodiment where it is configured for use on a Ford® Mustang® convertible vehicle. The illustrated embodiment is selected in order to set forth one of the best modes contemplated for the invention. However, it will be understood that the illustrated embodiment is merely exemplary and should not be considered a limitation when interpreting the scope of the appended claims.

Figure 1:
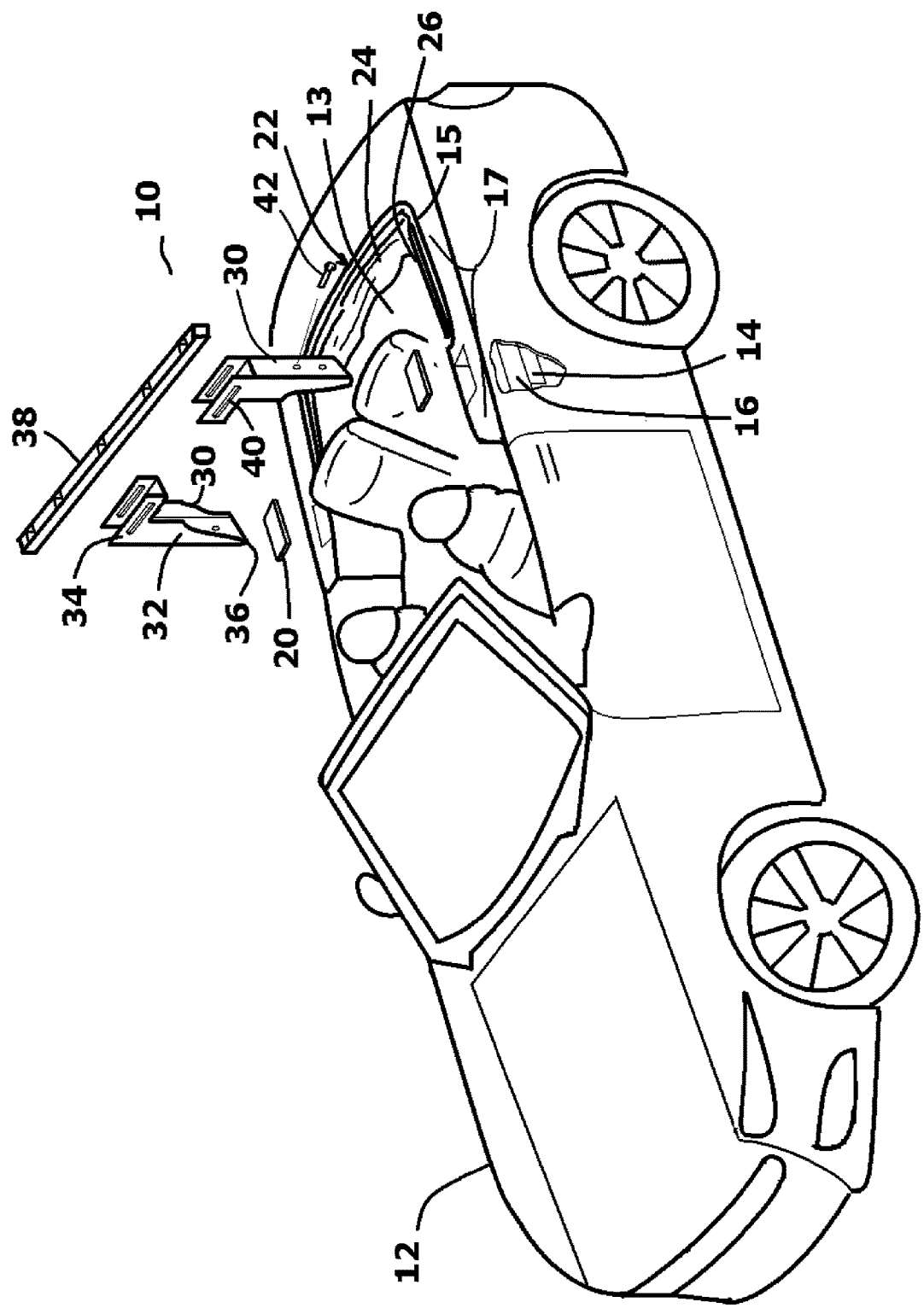
FIG. 1 is a perspective view of an exemplary embodiment of a cargo rack system being applied to vehicle with a convertible roof.
Figure 2:
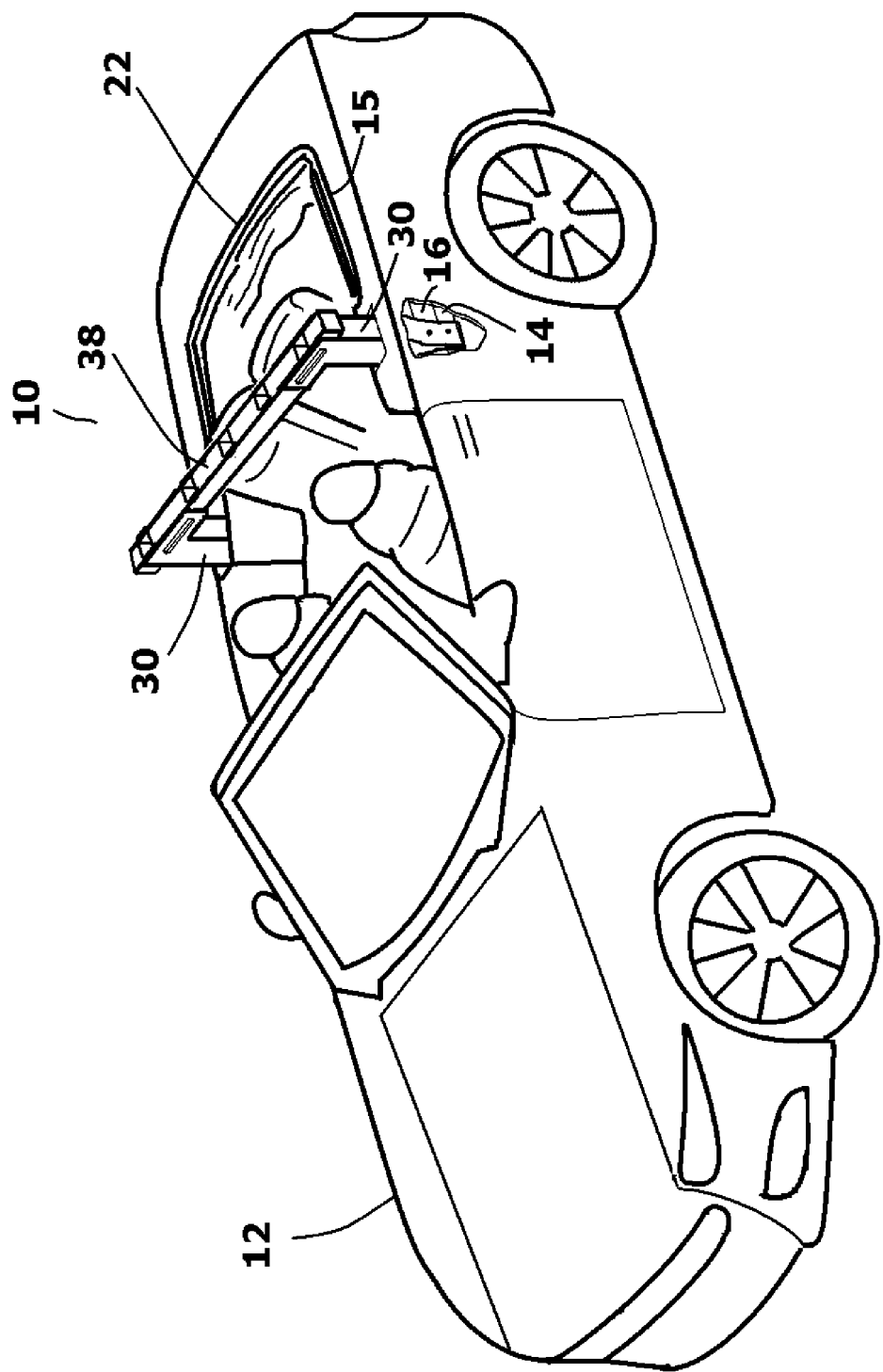
FIG. 2 is the same view as FIG. 1 with the cargo rack assembly shown in an exploded perspective.

Referring to FIG. 1 and FIG. 2, a cargo rack system 10 is shown in conjunction with an exemplary embodiment of a Ford® Mustang® convertible. Such a vehicle 12 has a convertible roof system 22. The convertible roof system 22 has a canopy 24 and a folding support framework 26. A roof well 13 is designed into the vehicle 12. The roof well 13 is sized to receive and store the convertible roof system 22 when not deployed. The roof well 13 is defined in part by the roof baseline 15. The roof baseline 15 is typically U-shaped and denotes the transition point where the canopy 24 of the convertible roof system 22 attaches to the metal of the vehicle 12. The roof baseline 15 has two side sections 17 that extend along the sides of the vehicle 12. Reinforced sections 16 of the frame 14 are located under the side sections 17 of the roof baseline 15. The reinforced sections 16 provide structural stability to the vehicle 12 and also serve as a base for the mounting of the convertible roof system 22. The reinforced sections 16 of the frame 14 can be accessed by removing access panels 20 that are manufactured into the trim package of the vehicle 12. The access panels 20 are provided to access the seat belt mounts and the convertible roof mounts, which are both anchored to the reinforced section 16 of the frame 14. If the access panels 20 are not provided in the model of the vehicle, then the trim can be removed or access openings can be cut into the trim by a trained installation professional.

The vehicle 12 has a convertible roof system 22. The convertible roof system 22 has a canopy 24 and a folding support framework 26. The folding support framework 26 of the convertible roof system 22 is attached to the reinforced section 16 of the frame 14. The access panels 20 provide access to the point of attachment. In this manner, the convertible roof system 22 can be selectively removed for repair or replacement. Under the access panels 20, the reinforced section 16 of the frame 14 has a certain shape. This shape can change depending upon the make, model and year of the vehicle 12.

The present invention cargo rack system 10 has two attachment brackets 30. Each attachment bracket 30 has a mounting post 32 and a mounting head 34. The mounting post 32 has a contoured free end 36 that is configured to match the contours of the reinforced section 16 of the frame 14 under the access panels 20. In this manner, the mounting post 32 can abut against the reinforced section 16 of the frame 14 within the confines of the area below the access panel 20. The mounting post 32 is anchored to the reinforced section 16 of the frame 14 using mechanical fasteners 42.

The mounting post 32 extends vertically and leads into the mounting head 34. The length of the mounting post 32 can be varied to accommodate different makes and models of the vehicle 12. Each mounting head 34 is sized and shaped to receive a crossbar 38. The crossbar 38 has a length long enough to extend across the width of the vehicle 12 between the two attachment brackets 30. The crossbar 38 bolts to the mounting heads 34, therein joining the two attachment brackets 30. Each mounting head 34 on the attachment brackets 30 contains an elongated slot 40. Each mounting head 34 engages the crossbar 38 using a mechanical fastener 42 that extends through the elongated slot 40. In this manner, the distance between attachment points can be varied to accommodate different makes and models of the vehicle 12, while still retaining the ability to connect to the same crossbar 38.

Referring to FIG. 3 and FIG. 4 in conjunction with FIG. 2, it can be seen that the crossbar 38 has a first end 44 and an opposite second end 46. In the illustrated embodiment, the crossbar 38 has a square cross-sectional profile. However, it will be understood that the crossbar 38 can be round, rectangular, or have any other cross-sectional shape that provides structural integrity and weight bearing capacity. Regardless of the selected cross-sectional shape, the crossbar 38 will have a top surface 50 and an opposite bottom surface 48. When mounted to a vehicle 12, the bottom surface 48 of the crossbar 38 will face toward the vehicle 12 and the top surface 50 will face vertically away from the vehicle 12.

A plurality of receptacles 54 are formed along the length of the crossbar 38. There is a receptacle 54 positioned near both the first end 44 of the crossbar 38 and the second end 46 of the crossbar 38. The remaining receptacles 54 are interposed periodically between the first end 44 and the second end 46. The number and spacing of the receptacles 54 are a matter of design choice and is only limited by the length of the crossbar 38.

In the illustrated embodiment, each of the receptacles 54 is merely a shaped hole that passes through the structure of the crossbar 38 from the top surface 50 to the bottom surface 52. Such a construction is merely exemplary. The receptacles 54 need not pass through the crossbar 38. Rather, receptacles 54 in the form of short open-ended tubes can be affixed to the sides of the crossbar 38, if preferred as an alternative. The receptacles 54 can be round but preferably have a square shape or some other non-round shape to prevent any rotational movement of objects received into the receptacles 54.

Figure 5:
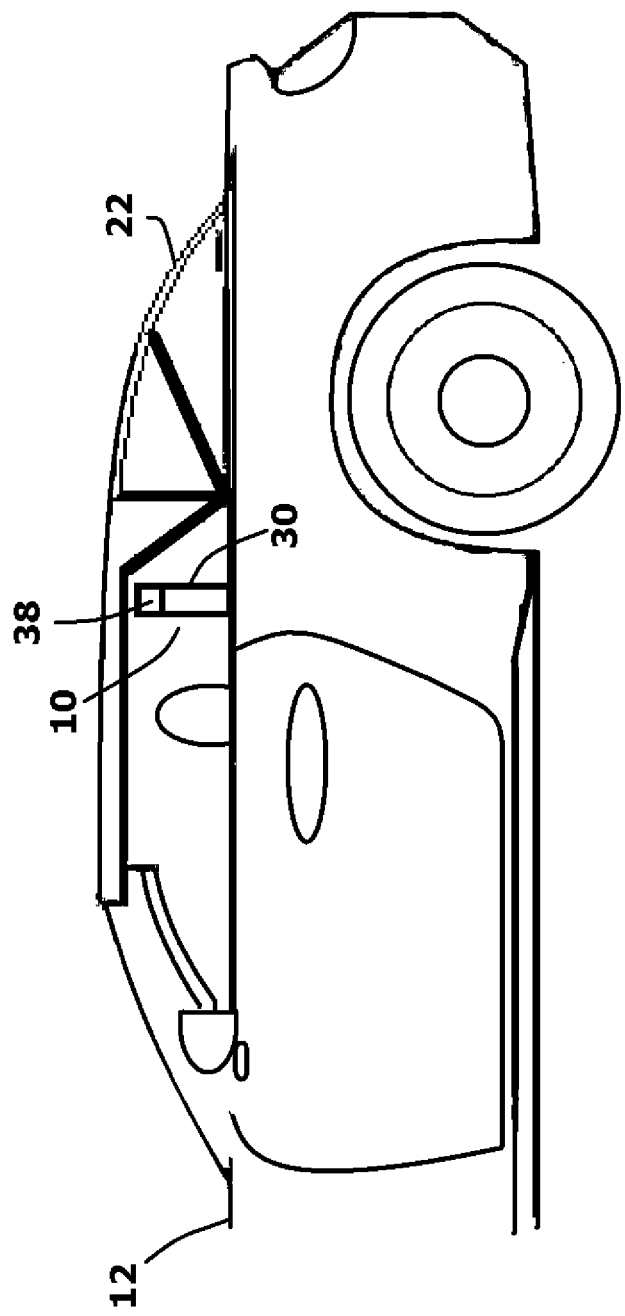
FIG. 5 is a partially fragmented view of the cargo rack assembly installed under a soft top roof of a vehicle.

The size of the attachment brackets 30 and the crossbar 38 are selected depending upon the convertible roof system 22 of the vehicle 12. Referring to FIG. 5, it can be seen that when the cargo rack system 10 is in place, the convertible roof system 22 of the vehicle 12 is still capable of being used. That is, the convertible roof system 22 can be closed over the attachment brackets 30 and the crossbar 38. As such, the cargo rack system 10 can be installed and left in place, without compromising the functionality of the convertible roof system 22.

Figure 6:
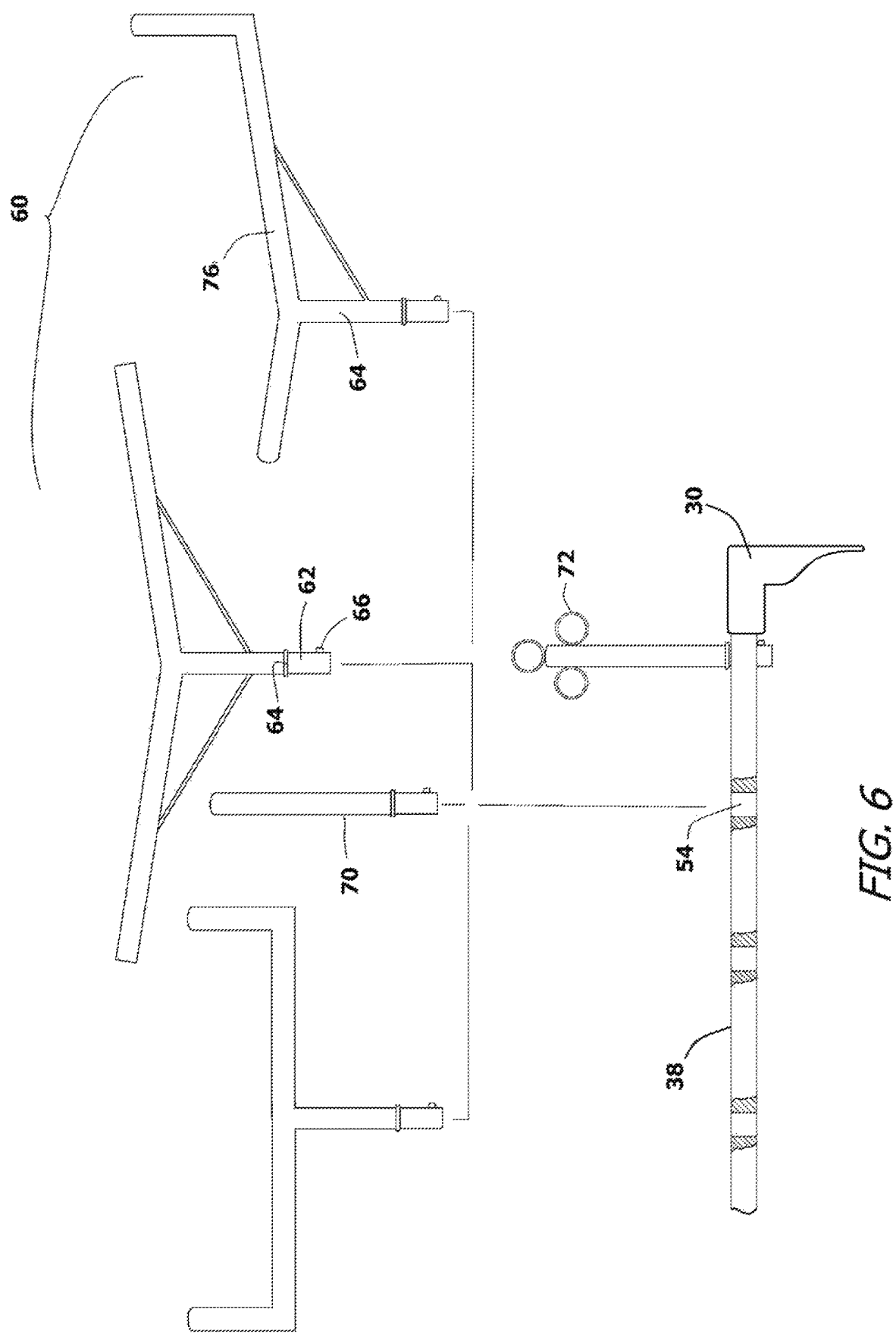
FIG. 6 is a front view of the exemplary mounting accessories shown with the mounting crossbar.

Referring to FIG. 6 in conjunction with FIG. 2, FIG. 3 and FIG. 4, it will be understood that in order to utilize the cargo rack system 10, the crossbar 38 is mounted in place. If a convertible roof system 22 is being used, it is retracted to expose the crossbar 38 or permit the attachment brackets 30 and the crossbar 38 to be installed. The crossbar 38 contains receptacles 54. A plurality of mounting accessories 60 are available, wherein each of the mounting accessories 60 can be attached to any of the receptacles 54. All of the mounting accessories 60 have a common connector 62. The connector 62 is shaped to pass into any receptacle 54. The connector 62 has a shape that can be received in the receptacle 54. There is a stop 64 formed on the connector 62 to limit the passing of the connector 62 into a receptacle 54. A locking mechanism 66, such as a detent, is provided to prevent each connector 62 from inadvertently exiting a receptacle 54.

The mounting accessories 60 can have many specialized configurations for specialized purposes. The simplest of the mounting accessories 60 is a post 70. The post 70 extends vertically away from any of the receptacles 54 on the crossbar 38. The posts 70 can have any lengths. Additionally, posts 70 can have loops 72 to help with the attachment of ropes and other strapping elements.

Mounting accessories 60 can also be specialized for specific carrier tasks, such as kayak carriers, bicycle carriers and the like. Such specialized mounting accessories 60 have connectors 62 coupled to a shaft 74. The shaft 74 elevates a U-shaped frame or some other yoke 76 that is specifically sized and shaped to hold a particular item. Since the receptacles 54 are located on the crossbar 38 at periodic points, the mounting accessories 60 can be positioned to customize the cargo rack system 10 to the particular shape and size of the load being carried.

Referring to FIG. 7, an alternate embodiment of a crossbar 80 is shown. This crossbar 80 can mount to the attachment brackets that were previously described. The crossbar 80 has receptacles 82 that are separate and distinct from the crossbar 80. The receptacles 82 are attached to a slide 84 that selectively engages the crossbar 80. The crossbar 80 has a slot 88 that can receive the slides 84. The slides 84 move in the slot 88 and enables the receptacles 82 to be adjustable into any position along the length of the crossbar 80. The receptacles 82 can be locked in place by manually tightening a locking knob 90.

The receptacles 82 are shaped and sized to receive any of the mounting accessories previously described with reference to FIG. 6. Since the receptacles 82 are adjustable along the crossbar 80, the mounting accessories can be positioned to customize the cargo rack system to the particular shape and size of the load being carried.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method of connecting a cargo rack to a vehicle having a convertible roof and a frame with reinforced frame sections that are covered by trim access panels along a roof baseline, wherein said convertible roof can be selectively positioned between an open roof configuration and a closed roof configuration, said method comprising the steps of:
    positioning said convertible roof into said open roof configuration;
    removing said trim access panels and exposing said reinforced frame sections of said frame;
    providing attachment brackets;
    mounting said attachment brackets to said reinforced frame sections of said frame; and
    mounting a crossbar between said attachment brackets, wherein said crossbar has a top surface and contains a plurality of receptacles periodically spaced along said top surface;
    wherein said attachment brackets and said crossbar are contained under said convertible roof and a gap space is present between said crossbar and said convertible roof when said convertible roof is in said closed roof configuration.

2. The method according to claim 1, further including providing mounting accessories, wherein each of said mounting accessories is configured to be selectively received by any one of said plurality of receptacles.

3. The method according to claim 1, wherein providing attachment brackets includes providing mounting posts that support mounting heads, wherein said mounting posts are configured to mount with said frame using mechanical fasteners.

4. The method according to claim 3, wherein said mounting posts support said mounting heads at an elevation between said frame and said convertible roof when in said closed roof configuration.

5. The method according to claim 4, wherein said mounting heads are shaped to receive and retain said crossbar.

6. The method according to claim 5, wherein said crossbar is adjustable in position when mounted to said mounting heads.

7. A method of connecting a cargo rack to a vehicle having a convertible roof system with a canopy that attaches to said vehicle along a roof baseline, and a roof well to accommodate said convertible roof system, wherein said convertible roof system mounts to reinforced frame sections that are covered by trim access panels along said roof baseline, said method comprising the steps of:
    providing attachment brackets;
    exposing said reinforced frame sections by removing at least some of said trim access panels;
    mounting said attachment brackets to said reinforced frame sections, wherein said attachment brackets extend above said roof well; and
    mounting a crossbar between said attachment brackets in a position that enables said canopy of said convertible roof system to be deployed above said crossbar, wherein said attachment brackets and said crossbar are contained under said canopy and a gap space is present between said crossbar and said canopy.

8. The method according to claim 7, wherein said crossbar has a flat top surface and contains a plurality of receptacles periodically spaced within said flat top surface.

9. The method according to claim 8, further including providing mounting accessories, wherein each of said mounting accessories is configured to be selectively received by any one of said plurality of receptacles.

10. The method according to claim 7, wherein providing attachment brackets includes providing mounting posts that support mounting heads, wherein said mounting posts anchor to said reinforced frame sections using mechanical fasteners.

11. The method according to claim 10, wherein said mounting posts support said mounting heads at an elevation between said roof well and said convertible roof system when said convertible roof system is closed.

12. The method according to claim 11, wherein said mounting heads are shaped to receive and retain said crossbar.

13. The method according to claim 12, wherein said crossbar has an adjustable mounting with said mounting heads.

* * * * *